United States Patent
Ebeling et al.

(10) Patent No.: US 9,786,201 B2
(45) Date of Patent: Oct. 10, 2017

(54) WEARABLE SOUND

(71) Applicant: Not Impossible LLC, Venice, CA (US)

(72) Inventors: Mick Ebeling, Venice, CA (US); David Francis Putrino, New York, NY (US); Daniel Biscaro Loureiro, New York, NY (US); Patrick Hanlon, Brooklyn, NY (US)

( * ) Notice: Subject to any disclaimer, the term of this patent is extended or adjusted under 35 U.S.C. 154(b) by 0 days.

(21) Appl. No.: 14/878,940

(22) Filed: Oct. 8, 2015

(65) Prior Publication Data

US 2016/0027338 A1 Jan. 28, 2016

Related U.S. Application Data

(63) Continuation-in-part of application No. 14/713,908, filed on May 15, 2015, now Pat. No. 9,679,546.
(Continued)

(51) Int. Cl.
*G09B 21/00* (2006.01)
*G09B 19/00* (2006.01)
(Continued)

(52) U.S. Cl.
CPC .............. *G09B 21/009* (2013.01); *G08B 6/00* (2013.01); *G09B 15/02* (2013.01); *G09B 19/00* (2013.01);
(Continued)

(58) Field of Classification Search
CPC .. G09B 21/009; G09B 19/00; G09B 19/0038; G09B 19/0015; G09B 15/02; G08B 6/00;
(Continued)

(56) References Cited

U.S. PATENT DOCUMENTS 5,290,964 A * 3/1994 Hiyoshi ................. G06F 3/014
                                                               84/600
5,314,403 A * 5/1994 Shaw ................. A61H 23/0236
                                                             297/217.1

(Continued)

FOREIGN PATENT DOCUMENTS

| WO | WO 2006/130559 A2 | 12/2006 | |
|----|----|----|----|
| WO | WO 2006130559 A2 * | 12/2006 | ............... H04R 1/02 |
| WO | WO 2010/033086 A1 | 3/2010 | |

OTHER PUBLICATIONS

Abstract of Branje, C. et al.; "Playing vibrotactile music: A comparison between the Vibrochord and a piano keyboard"; Int J Hum-Comput St; Apr. 2014; pp. 431-439; vol. 72 Issue 4.
(Continued)

*Primary Examiner* — David Warren
*Assistant Examiner* — Christina Schreiber
(74) *Attorney, Agent, or Firm* — Barcelo, Harrison & Walker, LLP

(57) ABSTRACT

Vibratory motors are used to generate a haptic language for music or other sound that is integrated into wearable technology. The disclosed system enables the creation of a family of devices that allow people with hearing impairments to experience sounds such as music or other auditory input to the system. For example, a "sound vest" or one or more straps comprising a set of motors transforms musical input to haptic signals so that users can experience their favorite music in a unique way, and can also recognize auditory cues in the user's everyday environment and convey this information to the user using haptic signals.

7 Claims, 9 Drawing Sheets

Related U.S. Application Data

(60) Provisional application No. 61/994,753, filed on May 16, 2014.

(51) Int. Cl.

| | | |
|---|---|---|
| *G09B 15/02* | (2006.01) | |
| *G10H 1/00* | (2006.01) | |
| *G10H 1/32* | (2006.01) | |
| *G08B 6/00* | (2006.01) | |
| *G10H 1/045* | (2006.01) | |

(52) U.S. Cl.
CPC ..... *G09B 19/0015* (2013.01); *G09B 19/0038* (2013.01); *G10H 1/00* (2013.01); *G10H 1/0033* (2013.01); *G10H 1/0066* (2013.01); *G10H 1/045* (2013.01); *G10H 1/32* (2013.01); *G10H 2210/056* (2013.01); *G10H 2220/106* (2013.01); *G10H 2220/321* (2013.01)

(58) Field of Classification Search
CPC ........ G10H 1/00; G10H 1/0066; G10H 1/045; G10H 1/32; G10H 2210/056; G10H 2220/106; G10H 2220/321; G10H 1/0033
USPC ................. 84/645, 470 R; 381/333
See application file for complete search history.

(56) References Cited

U.S. PATENT DOCUMENTS

| | | | | |
|---|---|---|---|---|
| 5,368,359 | A * | 11/1994 | Eakin | A61H 23/0236 297/184.14 |
| 5,553,148 | A * | 9/1996 | Werle | H04R 5/023 381/151 |
| 6,284,962 | B1 * | 9/2001 | Gardner | G10H 1/0083 455/88 |
| 7,035,422 | B1 * | 4/2006 | Wiener | H04R 1/025 381/301 |
| 8,144,911 | B2 * | 3/2012 | Chiang | H04R 19/013 381/172 |
| 8,343,066 | B1 | 1/2013 | Eagleman et al. | |
| 8,582,789 | B2 * | 11/2013 | Cheung | H04S 1/00 381/313 |
| 2003/0206642 | A1 * | 11/2003 | Menzies | H04R 5/023 381/333 |
| 2005/0113167 | A1 * | 5/2005 | Buchner | A63F 13/02 463/30 |
| 2008/0143080 | A1 * | 6/2008 | Burr | D04B 1/14 280/495 |
| 2009/0131165 | A1 * | 5/2009 | Buchner | A63F 13/02 463/30 |
| 2009/0262967 | A1 * | 10/2009 | Bryan | H04R 5/02 381/333 |
| 2009/0270758 | A1 | 10/2009 | Eagleman et al. | |
| 2011/0046687 | A1 * | 2/2011 | Naschberger | A61H 23/00 607/3 |
| 2012/0260789 | A1 * | 10/2012 | Ur | G09B 19/0038 84/470 R |
| 2014/0005579 | A1 * | 1/2014 | Drlik | A61H 23/0218 601/111 |
| 2014/0012167 | A1 * | 1/2014 | DeVlieger | A61H 23/02 601/111 |
| 2014/0070957 | A1 * | 3/2014 | Longinotti-Buitoni | A61B 5/6804 340/870.01 |
| 2014/0318699 | A1 * | 10/2014 | Longinotti-Buitoni | A61B 5/0002 156/247 |
| 2015/0013111 | A1 * | 1/2015 | White | H04R 1/025 24/3.1 |
| 2015/0062959 | A1 * | 3/2015 | Wilson | H05B 33/0803 362/570 |
| 2015/0097719 | A1 * | 4/2015 | Balachandreswaran | G01B 11/002 342/147 |
| 2015/0161908 | A1 * | 6/2015 | Ur | G09B 19/0038 84/470 R |
| 2015/0177939 | A1 * | 6/2015 | Anderson | G06F 21/35 715/745 |
| 2015/0217121 | A1 * | 8/2015 | Subramanian | A61N 1/3968 607/4 |
| 2015/0289034 | A1 * | 10/2015 | Engman | G09F 27/00 340/870.07 |
| 2015/0293590 | A1 * | 10/2015 | Lehtiniemi | G06F 3/016 715/702 |
| 2015/0317910 | A1 * | 11/2015 | Daniels | G09B 21/00 84/485 R |
| 2015/0324646 | A1 * | 11/2015 | Kimia | G06T 7/80 348/62 |
| 2015/0331488 | A1 * | 11/2015 | Grant | G06F 3/011 715/702 |
| 2015/0332659 | A1 * | 11/2015 | Ebeling | G09B 19/0015 84/645 |
| 2015/0356889 | A1 * | 12/2015 | Schwartz | G09B 21/009 340/4.12 |
| 2015/0366504 | A1 * | 12/2015 | Connor | A61B 5/6804 600/301 |
| 2016/0012688 | A1 * | 1/2016 | Eagleman | G06F 3/016 340/407.1 |
| 2016/0027338 | A1 * | 1/2016 | Ebeling | G09B 21/009 340/4.12 |
| 2016/0030854 | A1 * | 2/2016 | Shaanti | A63H 33/042 446/85 |
| 2016/0133151 | A1 * | 5/2016 | O'Dowd | G06F 3/011 434/236 |

OTHER PUBLICATIONS

Jonathan Kalan; "Why have so few innovations for deaf people actually made it to market? Jonathan Kalan discovers why and finds hope on the horizon"; BBC Future; Jul. 31, 2013; UK; downloaded Dec. 17, 2015 from http://www.bbc.com/future/story/20130731-helping-the-deaf-to-see-sound.

Kevin Lee; "Mouth-Mounted MP3 Player Lets You Hear Beats Through Your Teeth"; PCWorld; Jun. 1, 2012; downloaded Dec. 17, 2015 from http://www.techhive.com/article/256652/mouth_mounted_mp3_player_lets_you_hear_beats_through_your_teeth.html.

Renate Copper; "Beethoven, Music and The Deaf: A Brief Consideration of the Works and Struggles of Ludwig Van Beethoven"; Lifeprint.com: ASL University; May 14, 2007; USA; downloaded Dec. 17, 2015 from http://www.lifeprint.com/asl101/topics/beethoven02.htm.

"Woojer, the Wearable Audio Accessory That Lets You Feel the Sound"; Wearable Tech; http://www.wearabletechworld.com/topics/wearable-tech/articles; Nov. 21, 2013; accessed May 15, 2015; 2 pages.

"Woojer—Feel the Sound!"; Kickstarter, Inc.; https://www.kickstarter.com/projects; 2015; accessed May 15, 2015; 10 pages.

Saba et al.; "Hey yaa: A Haptic Warning Wearable to Support Deaf People Communiction"; Collaboration and Technology; 2011; vol. 6969; p. 215-223.

"ButtKicker Gamer 2 for Simulation and Gaming"; The Guitammer Company; http://www.thebuttkicker.com/gaming/; 2011; accessed May 15, 2015; 3 pages.

Yi Yang; "Design and Control of an Integrated Haptic Interface for Touch Screen Applications"; Thesis presented in the application to obtain the Doctorate degree in Science of the University of Lille; Nov. 2013; pp. 185; France.

Abstract of Hayes, L. et al.; "Imposing a Networked Vibrotactile Communication System for Improvisational Suggestion"; Organized Sound; Apr. 2012; pp. 36-44; vol. 17, Issue 1.

Dr. Stefano Papetti; "AHMI Audio-Haptic modalities in Musical Interfaces"; Institute for Computer Music and Sound Technology; Mar. 1, 2014; Zürich, Switzerland; downloaded Dec. 18, 2015 from https://www.zhdk.ch/index.php?id=icst_ahmi_e.

Jacob Siegal; "Good Vibrations: A Musical Glove That Improves Motor Skills"; PCWorld; Jul. 17, 2012; downloaded Dec. 17, 2015 from http://www.pcworld.com/article/259417/good_vibrations_a_musical_glove_that_improves_motor_skills.html.

(56) References Cited

OTHER PUBLICATIONS

Merlo, J.L. et al.; "Communicating Through the Use of Vibrotactile Displays for Dismounted and Mounted Soldiers"; 25th Army Science Conference; Nov. 2006; pp. 7; Orlando, FL.

McGuire, J. et al.; "Vibrotactile Device for Optimizing Skin Response to Vibration"; UW-BEM Design; Oct. 26, 2011; pp. 25; Madison, WI; downloaded Mar. 3, 2016 from http://bmedesign.engr.wisc.edu/projects/file/?fid=2148.

Good, A.; "Compensatory Plasticity in the Deaf Brain: Effects on Perception of Music"; 2014; Brain Sci; pp. 560-574; vol. 4.

Hoggan, E. et al.; "Audio or tactile feedback: which modality when?"; CHI'09 Proceedings of the SIGCHI Conference on Human Factors in Computing Systems; Apr. 9, 2009; pp. 2253-2256; New York, NY, USA.

Speaker allows deaf to feel music. Story from BBC News; Oct. 26, 2015; downloaded Dec. 17, 2015 from http://news.bbc.co.uk/go/pr/fr/-/2/hi/uk_news/england/london/4377428.stm.

Carmen Branje; "Feeling the Music: Vibrotactile music is the latest example of technology enabling the emergence of new art forms,"; Jul. 15, 2011.

Miga Motor Company; "DM01 Linear Shape Memory Alloy Actuator with Basic Stamp Microcontroller Kit"; Miga Motors; Mar. 1, 2007; downloaded Mar. 29, 2016 from http://www.migamotors.com/Media/DM01-BOE-App-Notes.pdf.

Choi, S. et al.; "Vibrotactile Display: Perception, Technology, and Applications"; Proc. IEEE; Sep. 2013; pp. 2093-2104; vol. 101, No. 9.

Yong, G. et al.; "Audio-Tactile Glove"; Proc. of the 16th Int. Conference on Digital Audio Effects (DAFx-13); Sep. 2-5, 2013; pp. 1-5; Maynooth, Ireland.

Hakon Knutzen; "Haptics in the Air—Exploring Vibrotactile Feedback for Digital Musical Instruments with Open Air Controllers"; Department of Musicology University of Oslo; Oct. 2013; pp. 1-106; Oslo Norway.

Mario Enriquez; "A Study of Haptic Icons"; The Faculty of Graduate Studies Department of Computer Science University of British Columbia; Oct. 2002; pp. 1-88; Vancouver, British Columbia, Canada.

Van Der Linden, J. et al.; "MusicJacket—Combining Motion Capture and Vibrotactile Feedback to Teach Violin Bowing"; IEEE T Instrum Meas; Jan. 2011; pp. 1-10; vol. 60; Issue: 1.

Inwook Hwang; "Perceptual Analysis of Vibrotactile Stimuli and Its Application to Vibrotactile Rendering of Music"; Department of Computer Science and Engineering Pohang University of Science and Technology; Jun. 24, 2013; pp. 1-116; Pohang, South Korea.

Satoshi Morita; "Sonic art for intersensory listening experience"; Proceedings of the Electroacoustic Music Studies NetworkConference, Electroacoustic Music Beyond Performance; Jun. 2014; pp. 1-11; Berlin, Germany.

Chafe, C.; "Tactile Audio Feedback"; Proc. Intl. Computer Music Conf.; Sep. 1993; pp. 76-79; Tokio, Japan.

Yao, L. et al.; "Music-touch shoes: vibrotactile interface for hearing impaired dancers." Proceedings of the 4th International Conference on Tangible and Embedded Interaction 2010; Jan. 24-27, 2010; pp. 275-276; Cambridge, MA, USA.

Morley, J.W.; "Perceived Pitch of Vibrotactile Stimuli: Effects of Vibration Amplitude, and Implications for Vibration Frequency Coding," J. Physiol.; May 9, 1990; pp. 403-416; vol. 431; Great Britain.

Manresa-Yee, C.; "A Vibrotactile interface to Motivate Movement for Children with Severe to Profound Disabilities" Proceedings of the XV International Conference on Human Computer Interaction (INTERACCION 2014); pp. 69-72; Aalborg Universitet, Denmark; downloaded on Dec. 18, 2015 from vbn.aau.dk.

Abstract of Ideguchi, T. et al.; "Influence of the Sensation of Vibration on Perception and Sensibility while Listening to Music"; Int J Innov Comput I; Mar. 2009; pp. 631-640; vol. 5 No. 5.

Giordano, M. et al.; "Perceptual and Technological Issues in the Design of Vibrotactile Augmented Interfaces for Music Technology and Media"; Haptic and Audio Interaction Design; vol. 7989 of the series Lecture Notes in Computer Science; pp. 89-98; HAID 2013, LNCS 7989; Springer-Verlag; Berlin Heidelberg.

Papetii, S. et al.; "Multi-point vibrotactile feedback for an expressive musical interface"; Proceedings of the International Conference on New Interfaces for Musical Expression; May 31-Jun. 3, 2015; pp. 235-240; Baton Rouge, LA, USA.

Gunther, E. et al. "Cutaneous Grooves: Composing for the Sense of Touch"; Journal of New Music Research; 2002; pp. 1-13; vol. 31 No. 1.

Nanayakkara, S.C. et al.; "Enhancing Musical Experience for the Hearing-impaired using Visual and Haptic Displays"; Jan. 2012; pp. 1-42; Human-Computer Interaction; vol. 28 No. 2.

Abstract of Darrow, A.A.; "The Effect of Frequency Adjustment on the Vocal Reproduction Accuracy of Hearing Impaired Children"; J Music Ther; 1990; pp. 24-33; vol. 27 No. 1.

Abstract of Darrow, A.A.; "The Effect of Vibrotactile Stimuli via the SOMATRON™ on the Identification of Pitch Change by Hearing Impaired Children"; J Music Ther; 1992; pp. 103-112; vol. 29 No. 2.

Abstract of Darrow, A.A. et al.; "The Effect of Vibrotactile Stimuli via the SOMATRON™ on the Identification of Rhythmic Concepts by Hearing Impaired Children"; J Music Ther; 1989; pp. 115-124; vol. 26 No. 3.

Jack Loftus; "Music for Deaf People Headphones Produce "Sound" Through Synesthesia"; GIZMODO; May 5, 2010; downloaded Dec. 17, 2015 from http://gizmodo.com/5551200/music-for-deaf-people-headphones-produce-sound-through-synesthesia.

Abstract of Gu, C. et al.; "Vibrotactile thresholds at the sole of the foot: effect of vibration frequency and contact location"; Somatosens Mot Res; Nov. 25, 2011; pp. 66-93; vol. 28 No. 3-4.

Israr, A. et al.; "Tactile Brush: Drawing on Skin with a Tactile Grid Display"; CHI 2011 • Session: Touch 1: Tactile & Haptics; May 7-12, 2011; pp. 2019-2028; Vancouver, BC, Canada.

Alan Cross; "This is New: Vibrotactile Music"; A Journal of Musical Things; Jun. 20, 2012; downloaded Dec. 18, 2015 from http://ajournalofmusicalthings.com/this-is-new-vibrotactile-music/.

The, Y.H.; "Experiments on the Audio Frequency Response of Shape Memory Alloy Actuators"; Jan. 2005.

Karam, M.; "Designing and Experiencing Audio-Tactile Displays"; eTELEMED 2010; Feb. 10-16, 2010; St. Maarten, Netherlands Antilles; downloaded Dec. 18, 2015 from http://www.iaria.org/conferences2010/fileseTELEMED10/AudioTactileDisplays.pdf.

Russo, F. A., et al.; "Vibrotactile Discrimination of Musical Timbre"; J Exp Psychol Hum Percept Perform; 2012; pp. 822-826; vol. 38 No. 4.

Morley, J.W et al.; "Perceived Pitch of Vibrotactile Stimuli: Effects of Vibration Amplitude, and Implications for Vibration Frequency Coding"; J. Physiol; 1990; pp. 403-416; vol. 431.

Marshall, M.T. et al.; "Vibrotactile Feedback in Digital Musical Instruments"; Proceedings of the 2006 Conference on New Interfaces for Musical Expression(NIME06); Jan. 2006; pp. 1-4; Paris, France; downloaded Dec. 18, 2015 from http://recherche.ircam.fr/equipes/temps-reel/nime06/proc/nime2006_226.pdf.

Eric Gunther; "Skinscape: A Tool for Composition in the Tactile Modality"; Thesis Submitted to the Department of Electrical Engineering and Computer Science in partial fulfillment of the requirements for a degree of Masters of Engineering MIT; May 23, 2001; pp. 118; Boston, MA, USA.

Emanuel E. Mahzoun; "Good Vibrations: A vibrotactile aid toward music sensation aiming at helping deaf people"; Thesis presented as part of Degree of Master of Science in Electrical Engineering with emphasis on Signal Processing BTH; May 2013; pp. 61; Blekinge, Sweden.

Jack, R. et al.; "Designing Tactile Musical Devices with and for Deaf Users: a Case Study"; Proceedings of the International Conference on the Multimodal Experience of Music 2015; Mar. 23-25, 2015; pp. 001-007; University of Sheffield, UK.

Lauren Sarah Hayes; "Skin Music: an audio-haptic composition"; Cycling '74: Tools for Sound, Graphics, and Interactivity Project #1065; 2012; Edinburg, Scotland; downloaded Dec. 18, 2015 from https://cycling74.com/project/skin-music-an-audio-haptic-composition/#.WBpOjuErKb8.

(56) References Cited

OTHER PUBLICATIONS

Saul Mate-Cid; "Vibrotactile Perception of Musical Pitch"; Thesis submitted in accordance with the requirements of the University of Liverpool for the degree of Doctor of Phylosophy, Acoustic Research Unit, School of Architecture; Dec. 2013; pp. 216; Liverpool, UK.
The Soundbeam Project Ltd; "Vibroacoustic products"; 2002; Bristol UK; downloaded Dec. 18, 2015 from http://www.soundbeam.co.uk/vibroacoustics/.
Birnbaum, D. et al.; "A Systematic Approach to Musical Vibrotactile Feedback"; International Computer Music Association; 2007; pp. 397-404; vol. 2007.
Beaufait, M. et al.; "Soundless Music"; Electrical and Computer Engineering University of Michigan, EECS 452: Digital Signal Processing Design Laboratory; Winter 2012; Poster; Michigan, USA; accessed Dec. 17, 2015 from http://www.eecs.umich.edu/courses/eecs452/Projects/W12/DesignExpoW12/SoundlessMusic_DesignExpoPoster.pdf.
Sujata Gupta; "Music for your Skin"; Jul. 9, 2014; NOVA Next; downloaded from http://www.pbs.org/wgbh/nova/next/body/haptic-hearing/.
Matt Kramer; "Vibro Acoustic"; Jul. 22, 2009; Orlando Florida; downloaded Dec. 18, 2015 from http://mattkramersoundhealing.com/.
David Richards Ternes; "Building Large Set of Haptic Icons: rhythm as a design parameter, and between-subjects MDS for evaluation"; Thesis submitted in Partial Fulfillment of the Requirements for the Degree of Master of Science in Computer Science; Aug. 2007; pp. 1-263; The University of British Columbia; Vancouver BC, Canada.

\* cited by examiner

WEARABLE SOUND

CROSS REFERENCE

This application is a continuation-in-part of U.S. patent application Ser. No. 14/713,908 filed May 15, 2015, which claims priority to U.S. Provisional Patent Application 61/994,753, entitled "Sound Vest", filed on May 16, 2014. The content of each of these applications is hereby incorporated by reference in its entirety.

TECHNICAL FIELD

This disclosure relates to, but is by no means limited to, a wearable vest designed to enable a hearing impaired person to experience sounds of various kinds, including but not limited to music, alarms, and speech. The disclosed technology has applications for both the hearing-impaired and hearing communities.

SUMMARY

An important aspect of the present disclosure is a system that uses vibratory motors to generate a haptic language for music (or other sound) that is integrated into wearable technology. The invention may be embodied as a "sound vest" designed to be used as an assistive device for the hearing impaired. Alternatively, or in addition, the invention may be embodied in the form of one or more straps configured to be worn on a selected part of a user's body. The disclosed system enables the creation of a family of devices that allow people to experience sounds in a new and different way. The sounds can be music or other auditory input to the system. The functionality of the vests or straps could include transforming sound/music input to haptic signals so that users can experience their favorite music in a unique way, and also systems that can recognize auditory cues in the user's everyday environment and convey this information to the user using haptic signals. Such pertinent auditory inputs could include a loud siren, someone calling out the user's name, etc. The vibratory motors could be made as thin as threads and be woven into the garment.

DETAILED DESCRIPTION OF ILLUSTRATIVE EMBODIMENTS

As discussed above, the present disclosure relates to a system, or "sound vest", that uses vibratory motors to generate a haptic language for music or other sound that is integrated into wearable technology. A technical challenge to creating such a system is to design a system that decomposes auditory input into control signals that can be streamed out to a network of motors. The present inventors have designed a preliminary system that performs entry-level signal processing techniques on the incoming sound in order to determine the spectral profile of the musical input. The motors are then powered based on the magnitude of the spectral power.

A preliminary design of the system enables the use of up to 64 motors to represent the incoming audio. (A revised design utilizes 64 motors on each of the front and back sides of the vest, for a total of 128 motors. For example, each of M1, M2, M3, and M4 in FIG. 2 could represent up to 16 separate motors, for a total of 64 motors on the front side of the vest 40. A similar network of 64 motors could be deployed on the back side of the vest.) The user's entire torso is utilized to create a tono-topic map of the torso—that is, vibratory motors on the left (L) side of the vest are mapped to the left speaker, vibratory motors on the right (R) side of the vest are mapped to the right speaker, vibratory motors on the bottom of the vest are mapped to low frequencies, and vibratory motors on the top of the vest are mapped to high frequencies.

Figure 1:
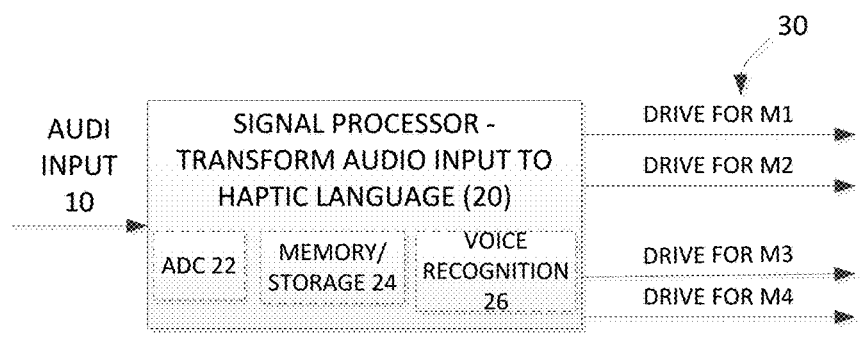
FIG. 1 is a block diagram of an illustrative embodiment of the inventive system.

FIG. 1 depicts the basic system including signal processor (20) that receives audio input (10) (e.g., from a microphone (50, see FIG. 2) or audio jack) and transforms the input audio signal into a haptic language for driving (30) a network of motors denoted M1, M2, M3, and M4. The signal processor may also include an analog-to-digital converter (ADC) (22) for digitizing real-time audio signals provided in analog form, memory or storage (24) for storing audio data, executable instructions, and the like; and a voice recognition module (26).

Figure 2:
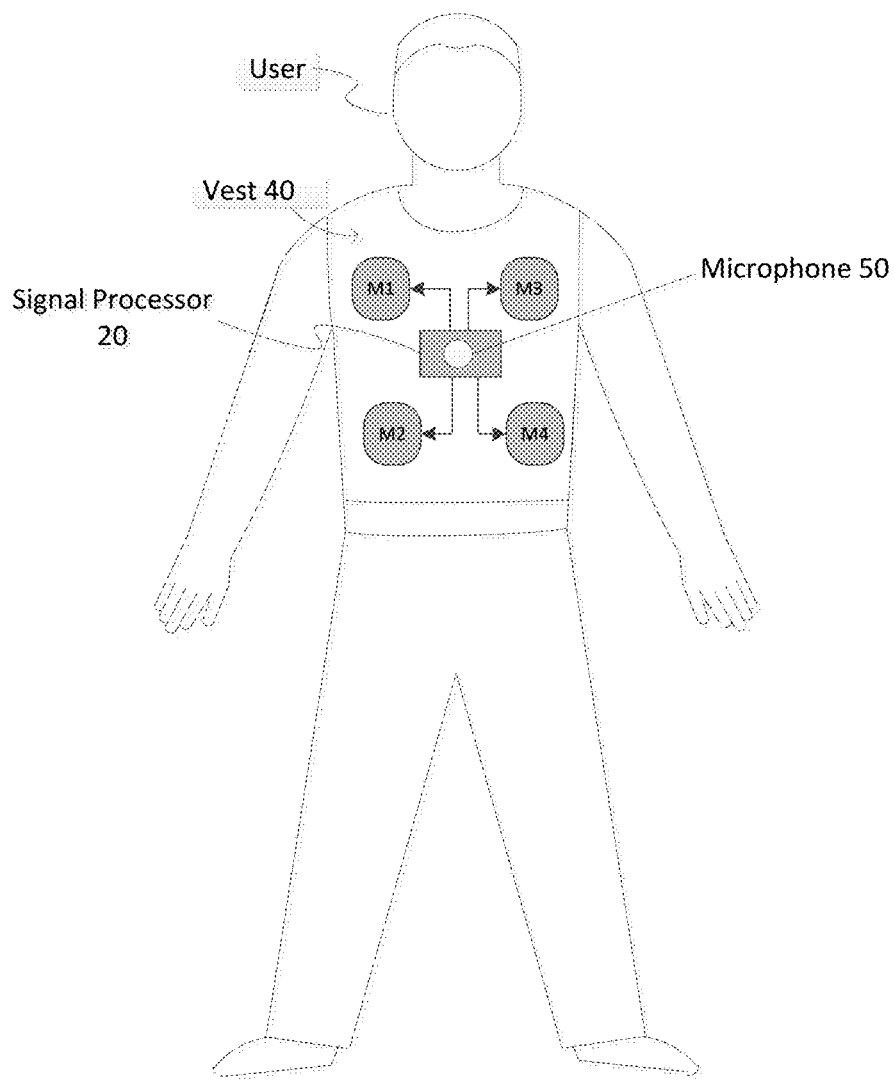
FIG. 2 depicts the inventive system integrated into a wearable vest.

As shown in FIG. 2, the motors M1 through M4 may be integrated into a wearable vest (40) such that M1 and M2 are on the right side of the user's torso and M3 and M4 are on the left side of the user's torso. Moreover, motors M1 and M3 vibrate to represent the higher frequency components of the audio input, whereas motors M2 and M4 vibrate to represent the lower frequency components. It should be understood that in a commercial implementation, there would likely be many more than four motors.

Figure 3:
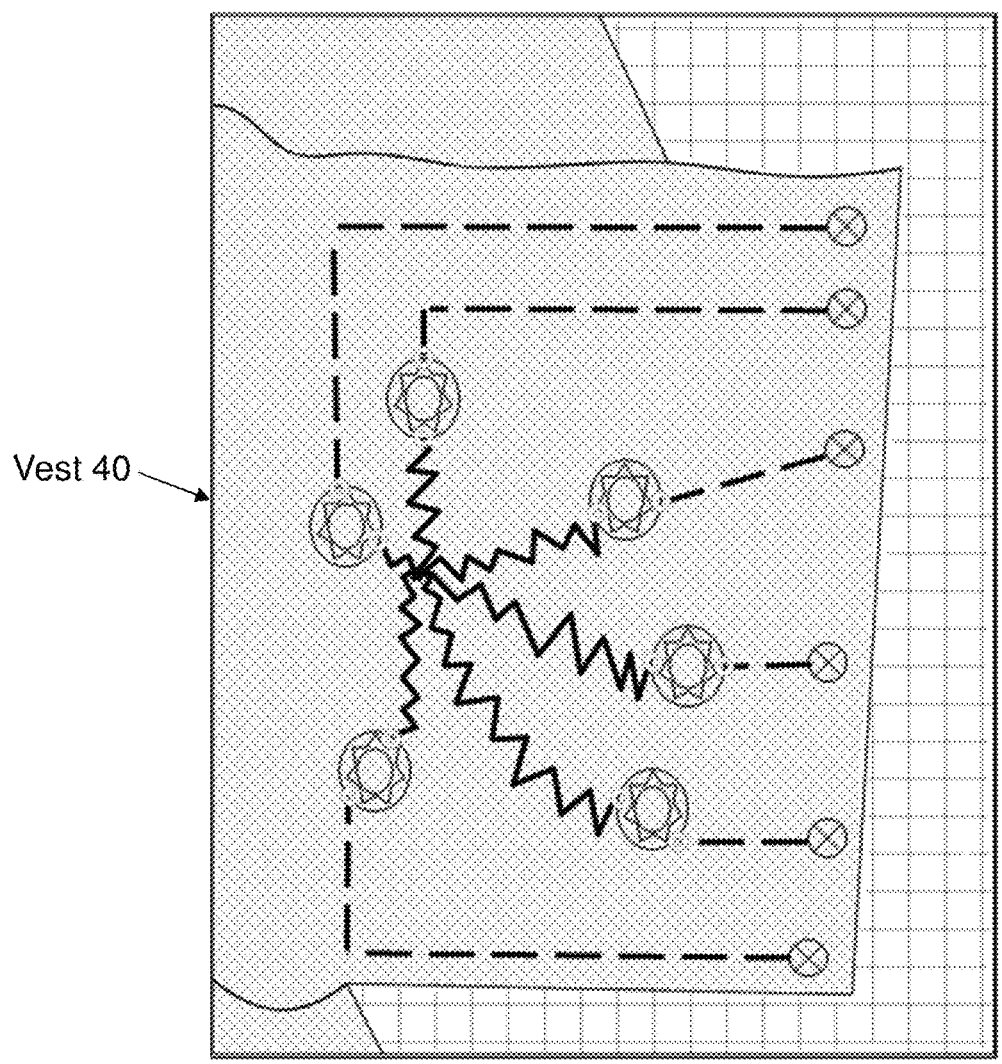
FIG. 3 is a photograph of a prototype in which a network of motors is stitched into a piece of fabric.

As shown in FIG. 3, using conductive thread and relatively low-cost vibratory motors, an initial prototype was made by stitching thread into fabric, as illustrated.

Applicants are aware of information in the public domain relating to wearable technology with haptic feedback. Documents relating to wearable technology with haptic feedback include the following (copies of these are being submitted herewith in an Information Disclosure Statement):

Wojer, http://www.wearabletechworld.com/topics/wearable-tech/articles/361051-woojer-wearable-audio-accessory-that-lets-feel-sound.htm;
https://www.kickstarter.com/projects/1382889335/woojer-feel-the-sound;
https://www.youtube.com/watch?v=svEJ1CgkERM;

Wearable speaker vest/jacket:
https://www.google.com/patents/US20090262967?dq=wearable+technology+for+hearing+impaired+to+feel+music&hl=en&sa=X&ei=XIkwU9yXHoe9qAG_oYHgDQ&ved=0CGQQ6AEwBzgK Haptic chair sound enhancing system:
https://www.google.com/patents/WO2010033086A1?cl=en&dq=wearable+technology+for+hearing+impaired+to+feel+music&hl=en&sa=X&ei=c4gwU5CaFonUqgGE1YGwDw&ved=0CDcQ6AEwAA;
https://www.google.com/patents/US8582789?dq=wearable+technology+for+hearing+impaired+to+feel+music&hl=en&sa=X&ei=c4gwU5CaFonUqgGE1YGwDw&ved=0CEUQ6AEwAg Wearable tactile subwoofer and its use:
https://www.google.com/patents/WO2006130559A2?cl=en&dq=wearable+technology+for+hearing+impaired+to+feel+music&hl=en&sa=X&ei=c4gwU5CaFonUqgGE1YGwDw&ved=0CEwQ6AEwAw Hey yaa: a Haptic Warning Wearable to Support Deaf People Communication:
http://www.academia.edu/2997186/Hey_yaa_a_Haptic_Warning_Wearable_to_Support_Deaf_People_Communication Gaming: http://www.thebuttkicker.com/gaming/

Some of these translate sound to vibration, but the present disclosure is different in that it goes beyond a simple sensory substitution. The brain is an amazingly "plastic" organ, and we will take advantage of its plasticity by giving the hearing impaired the opportunity to experience music through a haptic "language". This difference lies in the real-time spectral analysis performed as the music streams into the micro-controller at the heart of the sound vest—the audio streams in and is broken down to a representation of its basic frequency components. Then, each frequency domain is sent to a different part of the body (i.e., if the user is listening to Alvin and the Chipmunks, he will feel a lot of vibration up by his collarbones, and not much down low; listen to Barry White, and it will be the other way around due to the dominance of Mr. White's low frequency components). The inventive system can also represent stereo by streaming to the left side of the body for the left speaker and right speaker to the right side.

Figure 4:
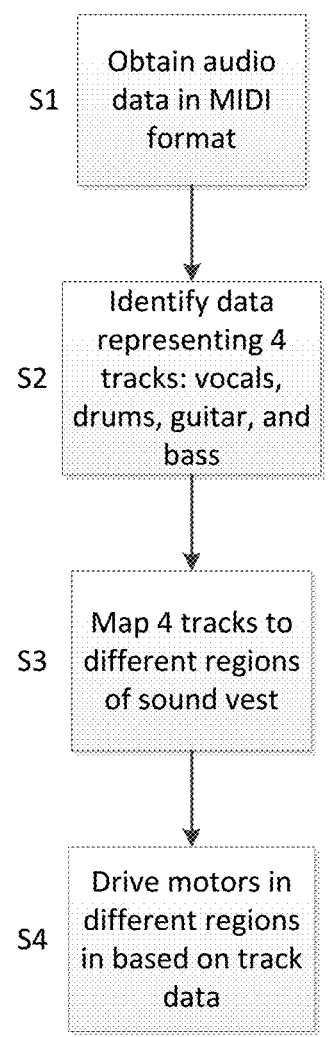
FIG. 4 is a flowchart of an inventive algorithm for converting audio data into signals for driving a network of vibrating motors incorporated into a wearable vest.

As shown in FIG. 4, an inventive algorithm for converting audio data into signals for driving a network of vibrating motors incorporated into a wearable vest comprises the following steps: First, in step S1, audio data in MIDI format is obtained. The data can either be downloaded to the system from a third party provider, or created using recorded audio and an audio production software tool. In step S2, the MIDI data is organized into 4 tracks representing vocals, drums, guitars, and bass. In step S3, the 4 tracks are mapped to different regions of the sound vest; and in step S4 the respective tracks of data are used to drive the motors in the different regions.

Finally, the system may be enhanced by providing wireless links between the signal processor and the motors. In addition, a voice recognition module may be incorporated to enable the system to recognize specific spoken words for selective playback through the motors. For example, the user's name may be specifically recognized and used to signal the user through the motors.

Further Developments

During the course of further developing the system described above, we have discovered that the process of creating musical sensation though tactile stimuli can be improved in several ways:

1. The audio signals can be improved by converting them into the MIDI (i.e., Musical Instrument Digital Interface) data format, and then reducing the data to a small defined number of tracks, e.g., four (4) tracks representing drums, bass, guitars, and vocal. Other selections could be used as well, depending on the type of music. (Those skilled in the art understand that MIDI is a technical standard that enables a wide variety of electronic musical instruments, computers and other related devices to connect and communicate with one another. A single MIDI link can carry up to sixteen channels of information, each of which can be routed to a separate device.)

2. Instead of mapping the audio signals to the motors as described above (i.e., mapping higher frequencies to the top of the vest and mapping the lower frequencies to the bottom of the vest), it may be advantageous to map each of the 4 tracks to different parts of the vest. For example, the signals corresponding to vocals can be directed to the mid-section while the drums, bass, and guitar signals are directed to respective regions surrounding the mid-section. This mapping has been found to create less cross-over and less "muddiness" to the vibrations created by the motors.

3. If the system is unable to convert live audio to MIDI data in real time, it can be advantageous to provide a mode in which the music data is first downloaded and then played back through the vest. In this way, the user can experience the music albeit not in a real-time, "live" setting.

4. The mapping described above works well with some sorts of music, but not all types. Thus, each type of music needs its own mapping. For instance, a classical piece by Bach might have a region mapped to the organ, a region mapped to the English horn, a region mapped to the flute, and a region mapped to a violin.

Figure 5A:
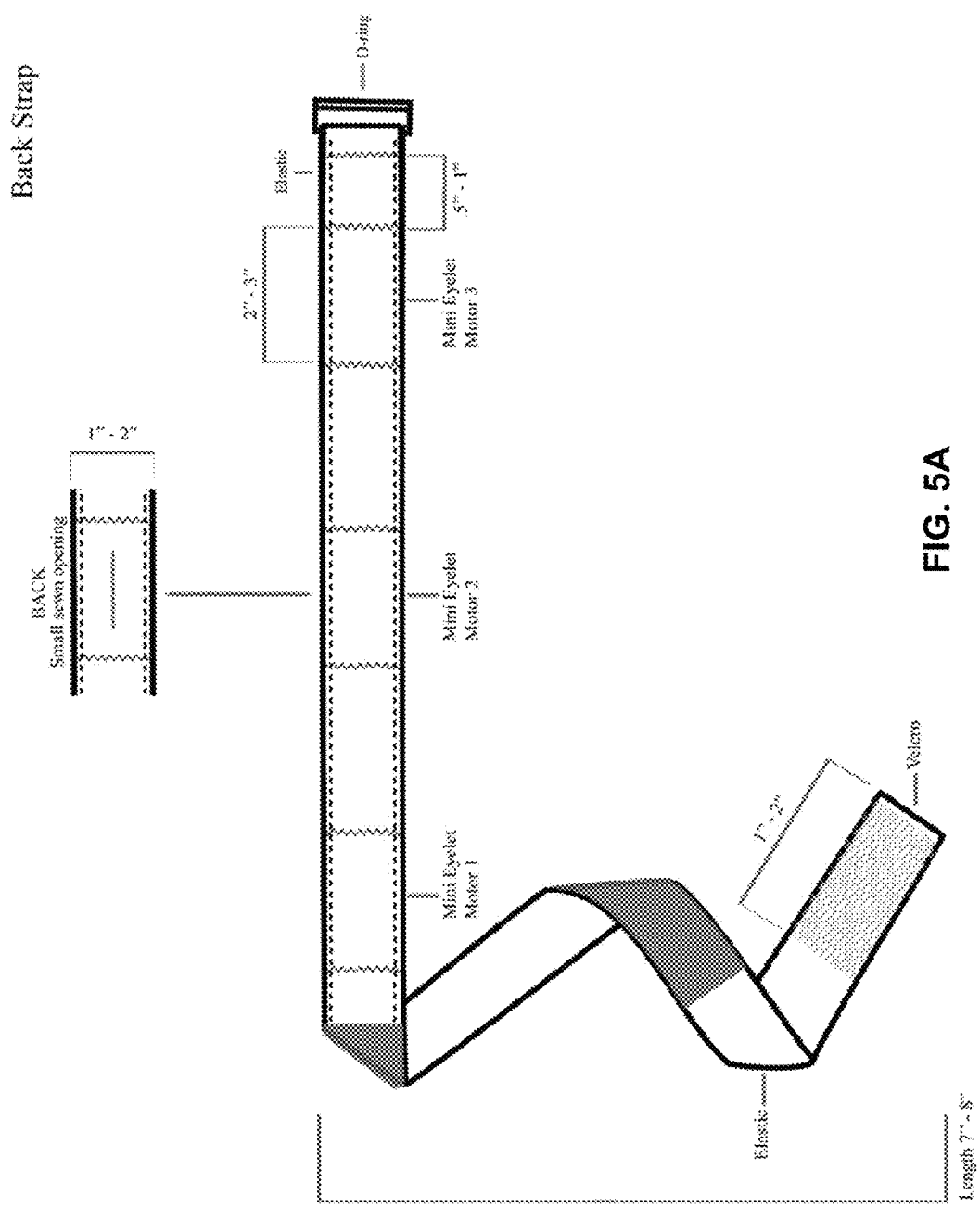
FIGS. 5A, 5B, and 5C depict examples of "strip" layouts for motors, specifically in the form of a back strap, chest strap, and wrist and ankle strap, respectively.
Figure 5B:
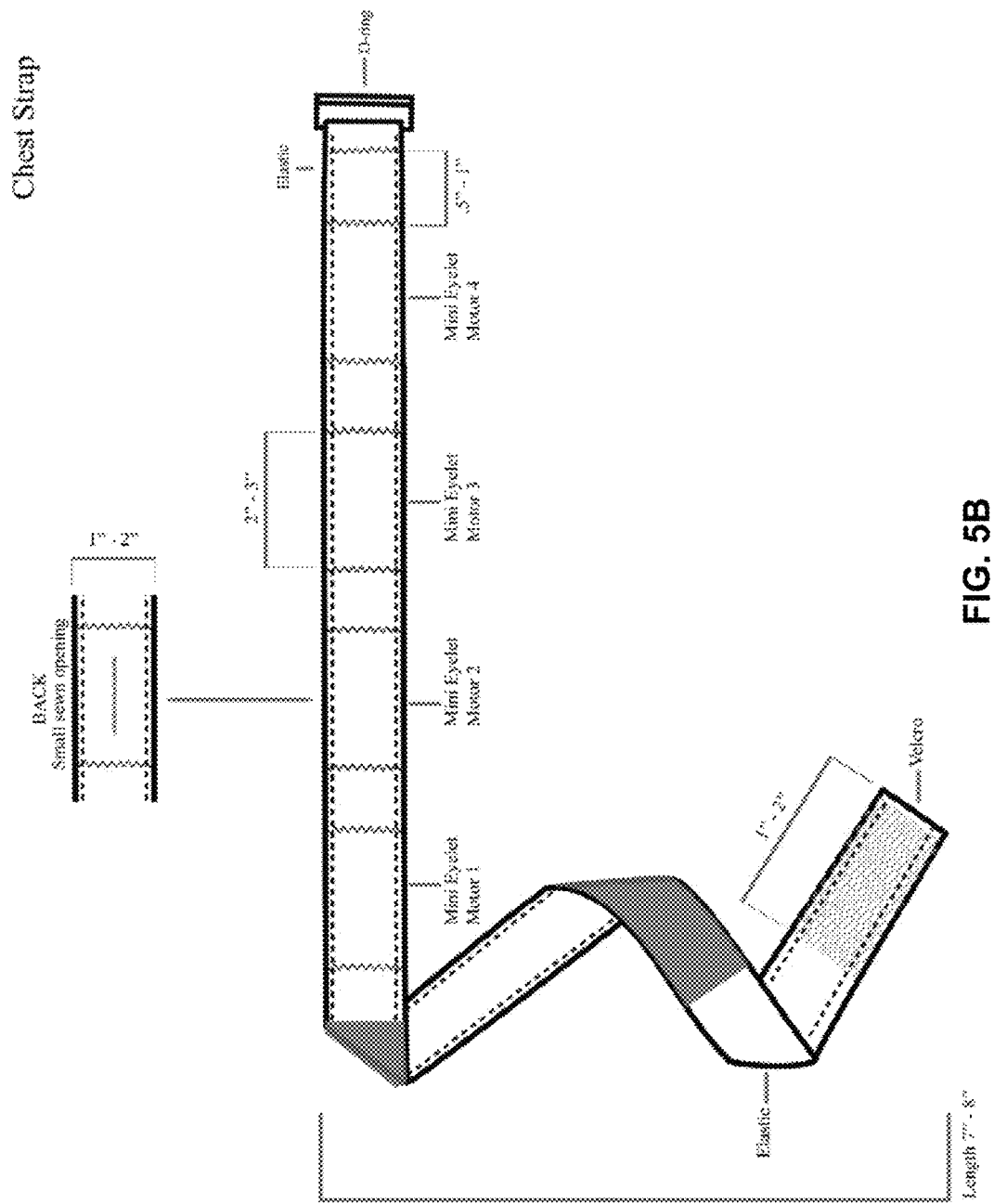
Figure 5C:
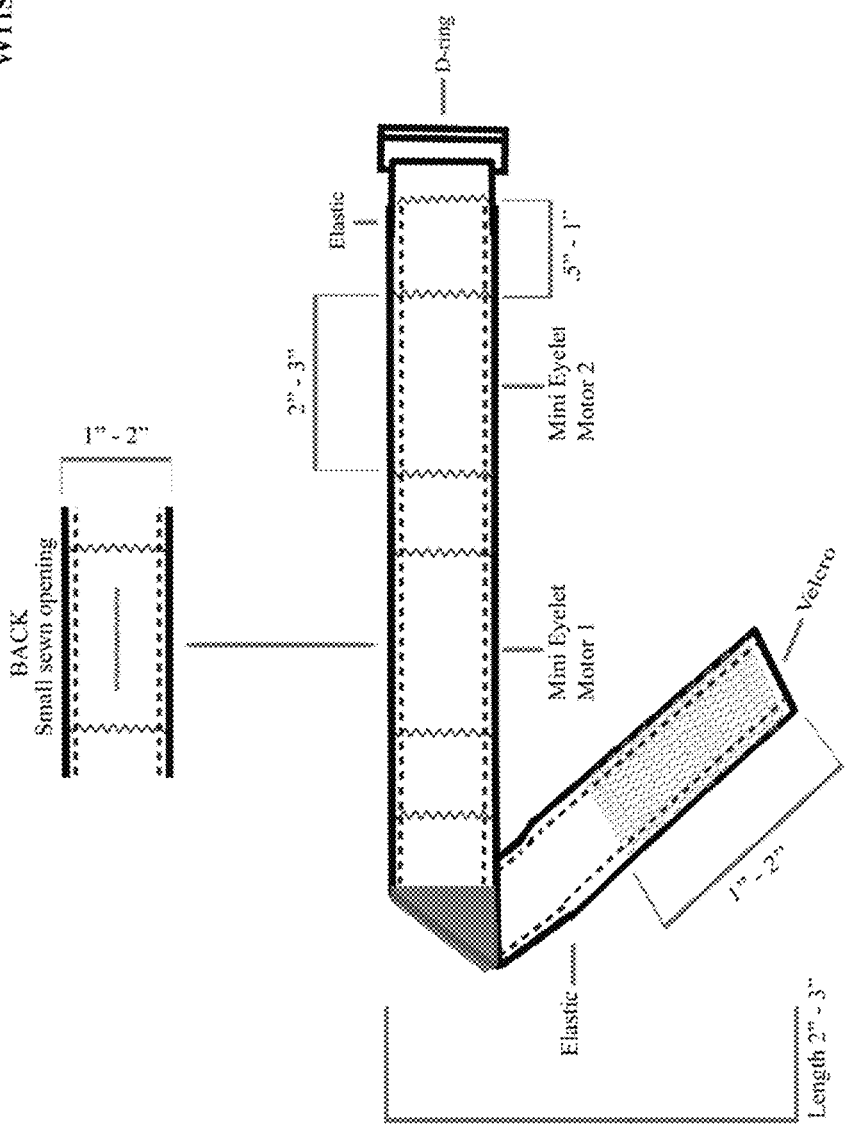
Figure 6:
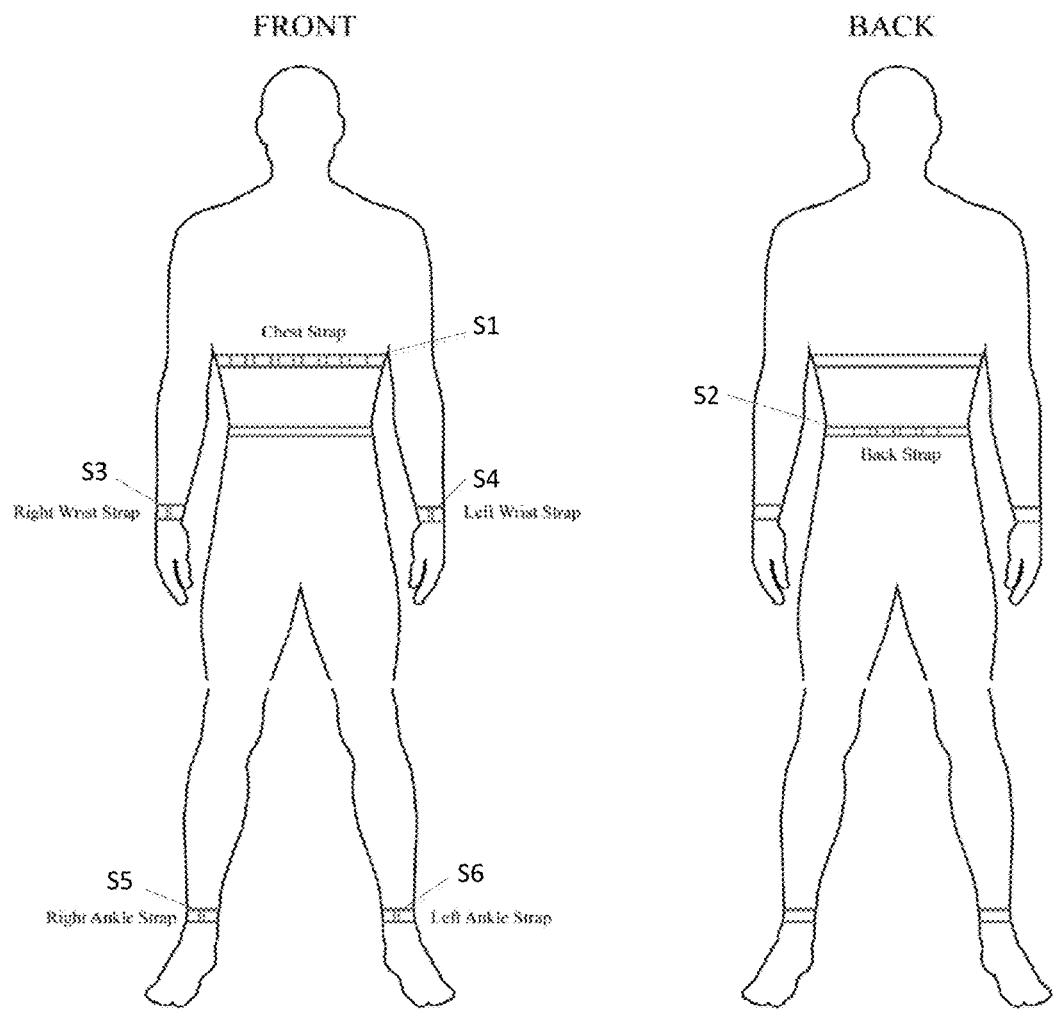
FIG. 6 depicts an example layout of strips (S1, S2, ... , S6) in various locations on a person. The number of motors on a given strip and at any location on the body may be 3, 4, 5, or more.

5. Instead of mapping the signals to a vest, it is also possible and perhaps even superior to map the signals to haptic drivers distributed around the body. One way to do this might be to use "strips" containing motors, as depicted in FIGS. 5A-C and 6. For instance, as shown in FIG. 6, this mapping may be accomplished by mapping vocals to a strip on the chest (S1), harmonies like a guitar track to a strip on the back (S2), bass to strips attached to the wrists (S3, S4), and drums to strips attached to the ankles (S5, S6). This mapping has been found to improve a user's experience of the music both from an ability to recognize songs and the overall user experience. In certain situations, it may prove useful to only use a partial implementation, e.g., one strip on one ankle. For instance, many of the hearing impaired enjoy dancing, but have a hard time staying on the beat due to an inability to hear the music. One strip, attached to the ankle and driving the motors in sync with the beat of the music, either using real time audio processing described above or recorded tracks, could prove useful to the hearing impaired. As mentioned, FIGS. 5A, 5B, and 5C depict examples of "strip" layouts for motors in the form of a back strap, chest strap, and wrist and ankle strap, respectively.

6. Different parts of the body have different abilities to discern vibration. For instance, the wrists are more sensitive than the chest. Accordingly, varying the type of data mapped to each location by sensitivity, and varying the intensity of experience (both by overall amplitude of vibration and frequency) by the sensitivity of the region has also improved the user's ability to distinguish information in the vibrations.

Figure 7:
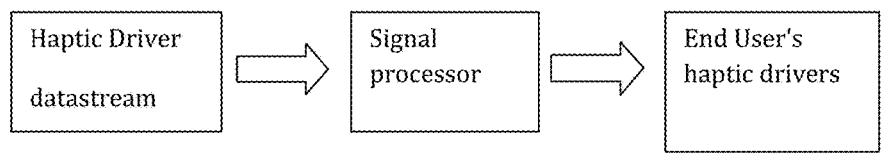
FIG. 7 illustrates a haptic driver data stream being input to signal processor the output of which is input to an end user's haptic drivers. This system may be employed to create desired vibratory sensations that are independent of music or that augment the music.
Figure 8:
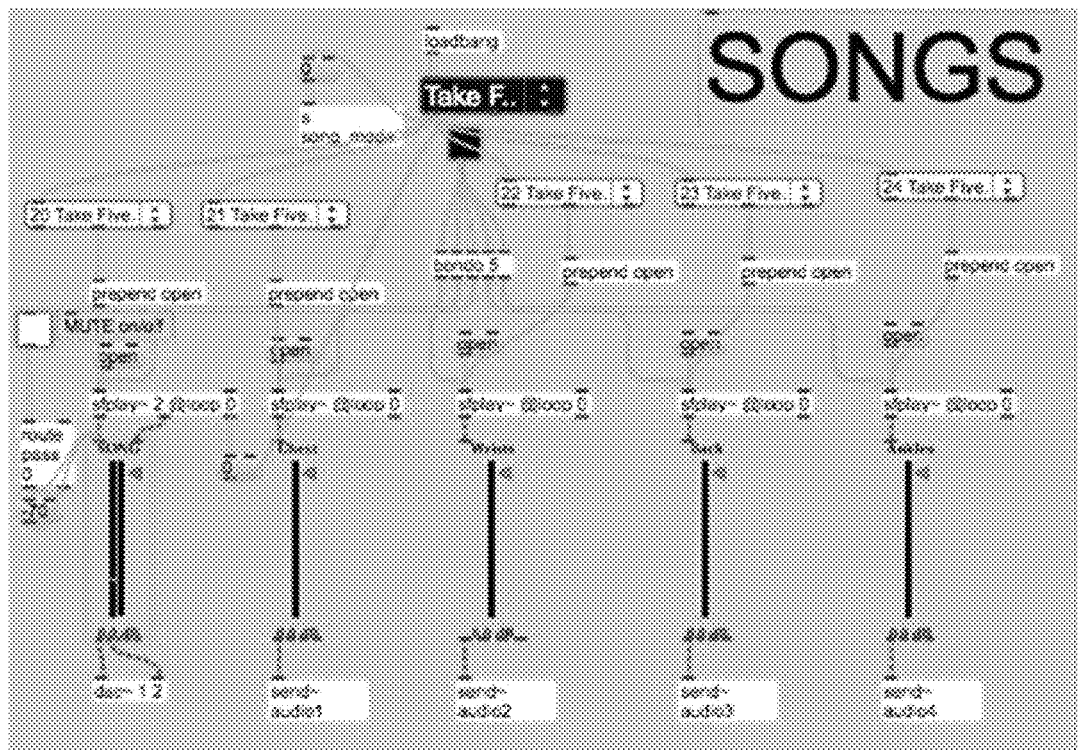
FIG. 8 illustrates a tool that may be employed for recording a "vibration track" and adding this track to sound data, either through a new data stream or further encoding in the audio track.
Figure 9:
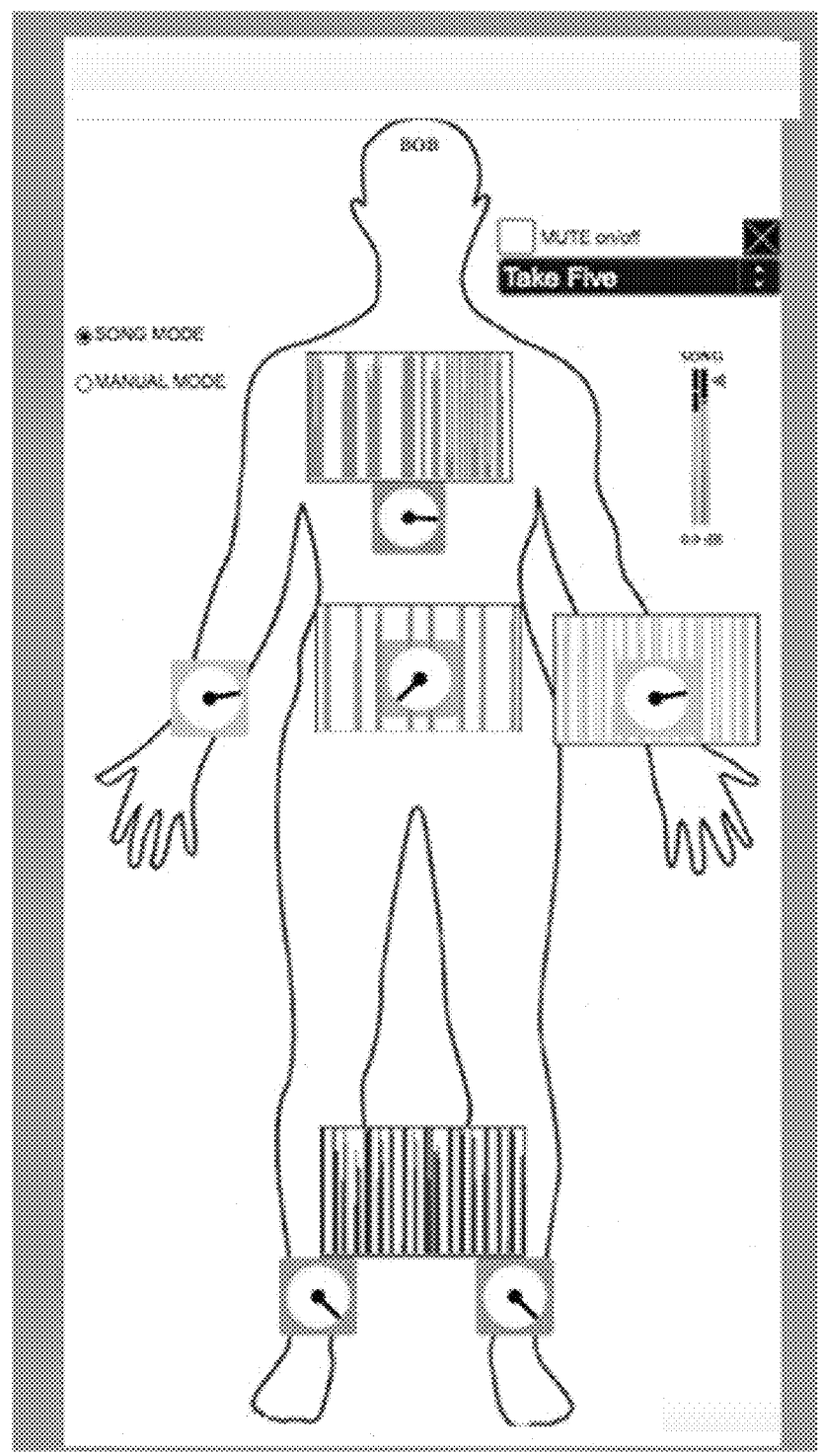
FIG. 9 illustrates a tool for crafting "augmented audio" experiences and for visualizing vibrations mapped to sites on the human body where the haptic drivers are worn.

7. It is possible to play the haptic drivers independently of music. For instance, a musician could create a "vibration track" to augment the auditory experience of the music, driving the haptic sensors directly. This is illustrated in FIG. 7, which shows a haptic driver data stream being input to a signal processor and the signal processor's out being input to an end user's haptic drivers for creating the desired vibratory sensations for the end user. This can happen both in live settings and in recorded settings, where the "vibration track" is recorded and added to the sound data, either through a new additional data stream, or utilizing further encoding in the audio track. Tools have been built for this purpose, and an example is illustrated in FIG. 8. In crafting these "augmented audio" experiences, seeing the visualization of the vibrations mapped to the sites on the human body where the haptic drivers are worn is useful. Tools have been created for this purpose, and are used to assist in the crafting of these experiences. An example of image produced by such a tool is illustrated in FIG. 9. The tool shown in FIG. 8 is like a finger powered drum machine that has sliders that may be moved to increase the amplitude of the pulse, and an open button for loading new recordings into the system. This allows the user to effectively play the haptic system like an instrument. The visualization, or image, depicted in FIG. 9 allows a producer or user to see what the levels are as they experience the haptic system, or as someone else experiences the system. The user could indicate desired changes in the experience, e.g., that the drums need to vibrate more strongly, and the producer could use the tool of FIG. 8 to do that.

Conclusion

The true scope the present invention is not limited to the illustrative embodiments disclosed herein. For example, the inventive "sound vest" described above is suitable for use as an assistive device for the hearing impaired, but it is by no means limited to such uses, since it has many applications for the hearing community. Similarly, the invention is not limited to a vest including vibratory motors as described. Instead, the invention could be implemented using wearable technology located on various, more appropriate under the circumstances, locations of the user's body. Accordingly, those skilled in the art will recognize alternative embodiments and uses within the scope of protection of the following claims.

We claim:

1. A system for transforming audio information to a haptic language, comprising: a signal processor (20) configured to receive an audio input (10) and simultaneously generate a plurality of electrical driving signals (30) according to a predefined mapping from audio signals comprising portions of said audio input to each of said plurality of electrical driving signals;

a wearable article (40, S1-S6); and a network of a plurality of vibratory motors (M1-M4) incorporated into the wearable article, wherein the plurality of electrical driving signals generated by the signal processor are used to drive the plurality of vibratory motors according to a predefined mapping of audio signals comprising portions of said audio input to a plurality of different regions of the article.

2. The system of claim 1, wherein the wearable article comprises a wearable vest configured to be worn on a user's abdomen.

3. The system of claim 1, wherein the wearable article comprises a strip configured to be worn as a strap around a selected location of a user's body.

4. The system of claim 1, wherein the wearable article comprises a plurality of separate strips each of which is configured to be worn as a strap around a selected location of a user's body.

5. A method for transforming audio information to a haptic language expressed through a wearable article, including a vest or one or more straps, comprising:

using a signal processor to receive an audio input and simultaneously generate a plurality of electrical driving signals according to a predefined mapping from audio signals comprising portions of said audio input to each of said plurality of electrical driving signals; and using the plurality of electrical driving signals to drive a network of a plurality of vibratory motors incorporated into the wearable article, wherein the plurality of electrical driving signals generated by the signal processor are used to drive the plurality of electrical vibratory motors according to a predefined mapping of audio signals comprising portions of said audio input to a plurality of different regions of the wearable article.

6. The method of claim 5, further comprising transforming the audio data into the plurality of electrical driving signals by obtaining audio data in a prescribed format; organizing the audio data into tracks; mapping the tracks to one of the plurality of different regions of the wearable article; and using the respective tracks of data to drive the motors in the corresponding region.

7. The method of claim 6, wherein the prescribed format is based on a MIDI (Musical Instrument Digital Interface) format.

* * * * *